United States Patent Office 3,564,006
Patented Feb. 16, 1971

3,564,006
PHTHALOCYANINE DYESTUFFS CONTAINING N,N-BIS(DIMETHYL - SULPHONIOETHYL)AMINOSULPHONYL GROUPS
Djavad Razavi, Paris, France, assignor, by mesne assignments, to Ugine Kuhlmann, Paris, France, a corporation of France
No Drawing. Filed Oct. 25, 1966, Ser. No. 589,239
Claims priority, application France, Oct. 29, 1965, 36,715
Int. Cl. C09b 47/04; D06p 1/14
U.S. Cl. 260—314.5           1 Claim

ABSTRACT OF THE DISCLOSURE

Dyestuffs which have one of the following formula:

$$A\text{---}\left[B\text{---}N=\left(\begin{array}{cc}R_1 & R_3 \\ -C-C-S-D \\ R_2 & R_4\end{array}\right)_2\right]_n$$

$$A\text{---}\left[B\text{---}N=\left(\begin{array}{ccc}R_1 & R_3 & R_5 \\ -C-C-S-D \\ R_2 & R_4 & \oplus\end{array}\right)_2\right]_n X_{2n}^{\ominus}$$

$$A\text{---}\left[B\text{---}N\begin{array}{l}\diagup\begin{array}{ccc}R_1 & R_3 \\ C-C-S-D \\ R_2 & R_4\end{array} \\ \diagdown\begin{array}{ccc}R_1 & R_3 & R_5 \\ C-C-S-D \\ R_2 & R_4 & \oplus\end{array}\end{array}\right]_n X_n^{\ominus}$$

in which A represents the residue of a dyestuff molecule, B represents a bridging linkage, D represents a substituted or unsubstituted alkyl, aralkyl or aryl group, $R_1$, $R_2$, $R_3$ and $R_4$ each represent hydrogen atoms or substituted or unsubstituted alkyl groups, $R_5$ represents an alkyl or aralkyl group, X represents a monovalent anion and $n$ is an integer. These dyestuffs are particularly useful for the colouration of textile fibres such as wool silk, polyamides and natural or rengerated cellulose in shades fast to wet tests.

---

The present invention is concerned with new dyestuffs, methods for their preparation, their application for the dyeing and printing of textile fibres, the materials dyed or printed with the aid of said dyestuffs and also with the intermediates used for their production. More specifically, this invention is concerned with new dyestuffs which are particularly useful for the coloration of textile fibers containing —NH— or —OH groups.

The new dyestuffs are characterized by the fact that their molecules contain groups which have the following formulae:

$$-B-N=\left[\begin{array}{cc}R_1 & R_3 \\ -C-C-S-D \\ R_2 & R_4\end{array}\right]_2 \quad -B-N=\left[\begin{array}{ccc}R_1 & R_3 & R_5 \\ -C-C-S-D \\ R_2 & R_4 & \oplus\end{array}\right]_2 X_2^{\ominus}$$

(I)                                           (II)

or
(III)

$$-B-N\begin{array}{l}\diagup\left[\begin{array}{cc}R_1 & R_3 \\ -C-C-S-D \\ R_2 & R_4\end{array}\right] \\ \diagdown\left[\begin{array}{ccc}R_1 & R_3 & R_5 \\ -C-C-S-D \\ R_2 & R_4 & \oplus\end{array}\right]\end{array} \begin{array}{c}X \\ \ominus\end{array}$$

in which B represents a bridging linkage such as for example one of the groups —$SO_2$—, —CO—, —$CH_2$—, —$SO_2$—NHR—, —CO—NHR— and —$CH_2$—NHR— or a direct bond and R is an alkylene, arylene or aralkylene group, D is an alkyl, aralkyl or aryl group which may be substituted, $R_1$, $R_2$, $R_3$ and $R_4$ are hydrogen atoms or alkyl groups which may be substituted, $R_5$ is an alkyl or aralkyl group and X is a monovalent anion.

It has been found, according to the present invention, that the dyestuffs containing the groups of Formulae II and III are reactive and capable of being fixed on textile fibres, in particular on wool, silk, polyamides, fibres of natural or regenerated cellulose, by a thermal treatment preferably carried out in the presence of acid-binding agents such as for example, alkali metal hydroxides, carbonates or bicarbonates or basic organic compounds such as aliphatic amines.

These dyestuffs may be used for dyeing in an aqueous medium, which is neutral or slightly alkaline, at a temperature of 40–100° C. They may also be used in foularding or printing; it is advantageous to add to the impregnation medium acid-binding agents, urea or other auxiliary products. The fabrics impregnated in this manner are treated by dry heat at 100° C. to 220° C. or by steaming with or without preliminary drying.

The dyestuffs containing the reactive groups of Formulae II and III can belong to varying classes such as for example anthraquinone, azo, nitro, phthalocyanine, oxazine, perinone, naphthoylene-imidazole or perylene-tetracarbonimide dyes. They may be metallisable or metalliferrous and may contain metals such as for example copper, chromium, cobalt, nickel, manganese or iron. In addition to the sulphonium groups (II) or (III) these dyestuffs may have water-solubilizing groups such as for example —$SO_3H$, —COOH, —$SO_2H$ provided that the number of these groups present in the dyestuff will be much smaller than the number of the sulphonium groups, so that the dyestuffs will be aways water-soluble.

The dyestuffs containing the groups of Formula I act as intermediates for the preparation of dyestuffs containing the groups of Formulae II or III. The group of Formula I may be introduced in the molecule of the dyestuff or one of its intermediates by reacting a sulphohalide, carboxyhalide, a carboxylic ester or a halogenomethyl derivative of the dyestuff or one of its intermediates with an aminodithioether of formula:

$$YN=\left[\begin{array}{cc}R_1 & R_3 \\ -C-C-S-D \\ R_2 & R_4\end{array}\right]_2 \quad \text{(IV)}$$

where Y represents a hydrogen atom or a group $H_2N$—R— and R, $R_1$, $R_2$, $R_3$, $R_4$ and D have the same significance as above.

The aminodithioethers of Formula IV which are new products and also form part of the invention, may be prepared by the condensation of a dihalogeno derivative of a secondary amine of the formula:

$$YN=\left[\begin{array}{cc}R_1 & R_3 \\ -C-C-hal \\ R_2 & R_4\end{array}\right]_2 \quad \text{(V)}$$

with a mercaptan of formula:

$$HS-D \quad \text{(VI)}$$

in the presence of an acid-binding agent; in these formulae Y, $R_1$, $R_2$, $R_3$, $R_4$ and D have the same significance as above.

The dyestuffs containing a group of Formula II or III may be obtained from the dyestuffs of Formula I by treating it with an alkyl or aralkyl ester of a mineral acid or organic sulphonic acids, such as an alkyl halide, alkyl sulphate, aralkyl halide or alkyl arylsulphonate. The amount of the alkylating or aralkylating agent used governs the formation of the dyestuffs containing the groups of Formula II or Formula III. These dyestuffs are stable in aqueous, neutral or slightly alkaline (i.e., having a pH between 7 and 9 inclusive) or acid media, and this makes it possible to store them in the form of aqueous solutions and makes them easy to apply.

If instead of starting with a dyestuff containing a sulphochloride, carboxychloride, carboxylic ester or halogenomethyl group, one starts with an intermediate product containing such a group it is possible to transform the latter into the appropriate dyestuff either before or after the treatment with an alkylating or aralkylating agent.

The dyestuffs according to the invention may be represented by the following general formulae:

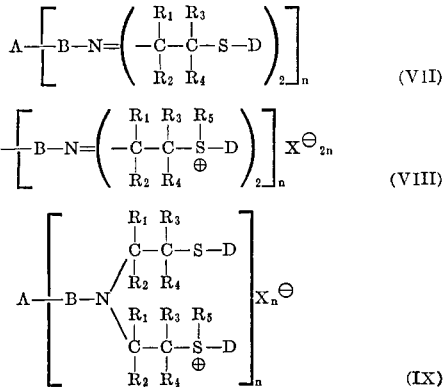

in which A represents the residue of the dyestuff molecule, B, R, D, $R_1$, $R_2$, $R_3$, $R_4$ and $R_5$ have the meanings given above and $n$ is an integer.

One particular type of dyestuff in accordance with this invention is represented by the formula:

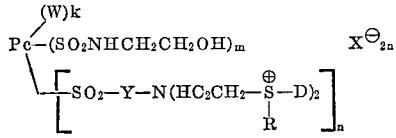

in which Pc represents the nucleus of an unsubstituted metalliferous phthalocyanine, the metal of which is copper, cobalt, chromium, nickel, manganese or iron, W represents —$SO_3H$, —COOH or $SO_2H$, Y represents a direct bond or —NH— alkylene, said alkylene having up to three carbon atoms, D and R each represent methyl or ethyl, $n$ is a number from 2 to 4, $k$ and $m$ each are 0 or a number up to 1, and X represents an uncoloured monovalent anion.

The following examples, in which all the parts are parts by weight unless otherwise indicated, are purely illustrative.

EXAMPLE 1

12 parts of copper phthalocyanine are introduced into 60 parts by volume of chlorsulphonic acid, whilst external cooling is applied, the mixture is then heated in half an hour to 135° C. and finally is maintained for 4 hours at 135–142° C. It is next cooled to 60° C., 20 parts by volume of thionyl chloride are added, the mixture is heated in half an hour to 95° C. maintained for one and a half hours at 95–98° C., cooled, poured into 250 parts of a saturated salt solution to which 500 parts of ice have been added, filtered, the filter cake washed with iced water, the product suspended in 200 parts of iced water, 10 parts of bis-(β-methylthioethyl)-amine hydrochloride are added, the mixture agitated for 7 hours at 0–5° C. whilst the pH is maintained at 10–10.5 with the aid of 2 N caustic soda, 3 parts of monoethanol-amine and 10 parts of sodium bicarbonate are added, the reaction mixture is agitated overnight at room temperature, heated in three quarters of an hour to 55° C. and then maintained at this temperature and pH 8.5 for 2 hours. The reaction mixture is then acidified with concentrated hydrochloric acid, filtered, the solid material washed with water and then dried in an oven at 50° C. This procedure results in the formation of 27 parts of a greenish blue powder.

20 parts of the dyestuff prepared in this manner are suspended in 50 parts water, heated to 50–55° C., 40 parts of methyl sulphate are added little by little and over a period of half an hour, the mixture is kept for half an hour at a temperature of 50–55° C. and then heated for another half an hour at 60–65° C. The solution is cooled and its pH is adjusted to 6.5 with the aid of a 2 N solution of sodium carbonate. The dyestuff is not precipitated by salting out its solution is concentrated or it is precipitated by the addition of acetone. One obtains a product of formula:

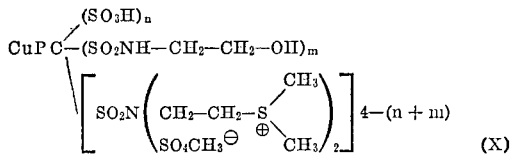

in which CuPC repersents the residue of copper pthalocyanine, 4—($n+m$) is equal to about 2, $m$ being equal to about 1.

The alkylation stage may also be carried out in the presence of a solvent by using the following experimental procedure: 10 parts of the dyestuff, prepared as described in the first paragraph of this example, are dissolved in 40 parts of acetic acid to which 4 parts of acetic anhydride have been added, 40 parts of methyl sulphate are added, the reaction mixture is heated to 80° C. in one hour, maintained at this temperature for a further hour, the solvent is decanted and the residue is dissolved in 50 parts of water at pH 6.

The bis-(β-methylthioethyl)-amine used for the preparation of this dyestuff may be prepared in the following manner: 370 parts of potassium hydroxide are added to 1600 parts by volume of ethyl alcohol containing 36 parts of water, the mixture is agitated until complete dissolution takes place, is cooled to —20° C. and 200 parts methanethiol are added. After several minutes stirring 360 parts of bis-(β-chloroethyl)-amine hydrochloride dissolved in 500 parts by volume of ethyl alcohol are added, the mixed solution is agitated for 7 hours at room temperature and then is left overnight. Next day the solution is refluxed for 2 hours, is cooled to room temperature, filtered in order to eliminate the potassium chloride which has been formed, 200 parts of concentrated hydrochloric acid are added and then the solvent and water are distilled off under reduced pressure. This procedure results in the formation of bis-(β-methylthioethyl)-amine hydrochloride, which is washed with acetone and ether and finally is dried in a vacuum desiccator. The product recrystallized from chloroform has a melting point of 227–228° C.

Analysis.—Calculated for $C_6H_{16}ClNS_2$ (percent): C, 35.73; H, 7.94; N, 6.94; S, 31.76. Found (percent): C, 35.79; H, 8.11; N, 7.11; S, 31.19.

The dyestuff may be applied, for example, in the following manner: 3 parts of urea and 0.4 part of sodium carbonate are added to a solution of 0.7 part of the dyestuff in 15 parts of water and a cellulosic fabric is then foularded in this solution, dried at 80° C., treated in an oven for 1–5 minutes at 100° C. to 150° C., washed with water and finally washed with soap and boiling water. This treatment gives with an almost quantitative yield an extremely brilliant shade of blue with an excellent fastness to wet tests, light and chlorine.

EXAMPLE 2

Copper phthalocyanine tetrasulphochloride is prepared from 12 parts of copper phthalocyanine by the method according to Example 1 and the filter cake of the sulphochloride which is thus obtained is treated with 12.5 parts of bis-(β-methylthioethyl)-amine hydrochloride for 7 hours at 0–5° C. and maintained at pH 10–10.5 by means of 2 N caustic soda. Next 1.5 parts of monoethanolamine and 7 parts of sodium bicarbonate are added, the mixture is agitated overnight at ambient temperature, is heated in three quarters of an hour to 50–55° C., maintained at this temperature for 2 hours, acidified with hydrochloric acid, filtered, washed with water and finally dried. A greenish blue powder is obtained. The treatment of this powder with methyl sulphate in an aqueous medium by the process described in Example 1 or in an excess of methyl sulphate at 80° C. or with methyl sulphate in the presence of a solvent provides a dyestuff which is very soluble in water.

This dyestuff may be applied according to the procedure described in Example 1 or in the following manner: A cellulosic or woollen fabric is introduced into a neutral solution containing 50 parts per litre of the dyestuff obtained by the method described in the preceding paragraph, the solution is brought to the boil in three quarters of an hour, this temperature is maintained for a quarter of an hour and the fabric is then rinsed with hot water. A very brilliant shade of blue is obtained which is fast to wet treatments. The cellulosic fabrics can still be treated for 40–45 minutes in a 3% sodium carbonate solution at about its boiling point. This provides a blue shade which is very fast to wet tests and has excellent general fastness.

If monoethanolamine is eliminated and a slight excess of bis-(β-methylthioethyl)-amine is used one obtains a blue dyestuff which has a slightly more greenish tone.

EXAMPLE 3

15 parts of 1,4-bis-(2',6'-dimethylphenylamino)-anthraquinone are introduced into 90 parts of chlorosulphuric acid which is cooled externally, the mixture is heated in one hour to 70–75° C., maintained at this temperature for 4 hours, cooled at 60° C., 20 parts of thionyl chloride are added and the reaction mixture is heated gently to 95° C. The reaction mixture is then maintained at this temperature for 2 hours, cooled to room temperature, poured into 250 parts of sodium chloride solution to which 500 parts of ice have been added, filtered and the filter cake is washed with iced water. The sulphochloride filter cake which has thus been obtained is suspended in 300 parts of ice and water, 15 parts of bis-(β-methylthioethyl)-amine hydrochloride are added and after several minutes stirring the pH value is adjusted to 10–10.5 with the aid of 2 N solution of caustic soda. The mixture is agitated for 7 hours at 0° C. and the same pH, 5 parts of sodium bicarbonate are added, the reaction mixture is agitated overnight at room temperature, acidified with hydrochloric acid, filtered and then dried. A dark blue powder is obtained which is insoluble in water. This dyestuff is solubilized by transforming the thioether groups into sulphonium groups by means of methyl sulphate according to the method described in Example 1. This results in the formation of a water-soluble dyestuff capable of dyeing cellulosic, woollen and silk fabrics in reddish blue shades which are very fast to wet tests. The dyestuff obtained is the tetrasulphomethylate of 1,4-bis-[4' - N,N - bis - (dimethylsulphonioethyl)-sulphamyl - 2',6' - dimethyl-phenylamino]-anthraquinone.

EXAMPLE 4

15 parts of a dioxazine dyestuff of the formula:

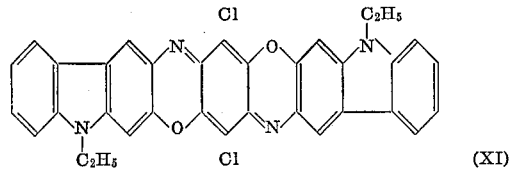

(XI)

are introduced into 150 parts of chlorosulphuric acid whilst applying external cooling, the mixture is heated in one hour to 115–120° C., maintained at this temperature for four and a half hours, cooled to 50–60° C., 45 parts of thionyl chloride are added, the temperature is raised to 90–95° C. and is maintained for three hours. After this period of time the reaction mixture is allowed to cool to room temperature, poured into a mixture of ice and water, filtered, the filter cake is washed with iced water, the sulphochloride filter cake obtained in this manner is suspended in 200 parts of iced water, 25 parts of bis-(β-methylthioethyl)-amine hydrochloride are added, the pH value is adjusted to 10.5–11 with the aid of a 2 N solution of caustic soda and the reaction mixture is agitated for 7 to 8 hours at 0° C. whilst the pH is maintained at about 10.5 with the aid of 2 N caustic soda. Next 10 parts of sodium carbonate are added, the reaction mixture is agitated overnight at room temperature, filtered and the filter cake is washed with water, then with water acidified with hydrochloric acid and finally again with water and then is dried at 50° C. One thus obtains 37 parts of a dark blue powder which is insoluble in water, alkalis and dilute acid.

10 parts of this insoluble dyestuff are suspended in water at 50–55° C., 20 parts of methyl sulphate are added over a period of half an hour, the temperature is maintained constant for another half an hour, then is raised to 60–65° C. and is maintained for half an hour. The solution of the dyestuff is cooled to 0° C., the pH is adjusted to 6.5 with the aid of a 40% solution of caustic soda, filtered at 0° C. in order to eliminate the sodium sulphate which has crystallised out and then the volume of the filtrate is increased to 100 parts by the addition of water. The dyestuff obtained is the sulphomethylate of the compound of Formula XI containing about 3.5 bis-(dimethyl-sulphonio-ethyl)-aminosulphonyl substituents.

This dyestuff is applied on cellulosic fabrics either by the method of Examples 1 or 2 or by the following method: A dye bath comprising the following constituents is prepared:

100 parts by volume of the dyestuff solution which has been thus prepared,
0.5 parts of sodium carbonate,
0.2 parts of the polycondensation product of alkylphenol and ethylene oxide,
99 parts of water.

The bath is maintained at 50° C., cotton or viscose twist thread is introduced into the bath, the temperature is raised to 80° C. and then is maintained for three quarters of an hour. A dyeing of a marine blue shade is obtained and the exhaustion of the dye bath is very good.

EXAMPLE 5

15 parts of 1,4-bis-(2',4',6'-trimethyl-phenylamino)-anthraquinone are introduced into 110 parts of chlorosulphonic acid whilst external cooling is applied, the reaction mixture is heated in half an hour to 70° C., maintained for 4 hours at 75–80° C., 30 parts of thionyl chloride are added over a period of 20 minutes, the reaction mixture is heated for 3 hours at 95–98° C. and then is allowed to cool down to room temperature. The solution of the sulphochloride is poured into a mixture of water and ice, filtered and the solid material is washed with iced water. The sulphochloride filter cake obtained in this manner is suspended in 200 parts of ice water, 13 parts of bis-(β-methylthioethyl)-amine hydrochloride are added, the pH is adjusted to 10.5 with the aid of 2 N caustic soda, the mixture is agitated for 8 hours at 0–5° C. whilst the pH is maintained at about 10.5 and finally is stirred overnight at room temperature. After this treatment the reaction mixture is heated to 50–60° C. in half an hour, maintained at this temperature for 4 hours whilst the pH value is kept at 8 with the aid of 2 N caustic soda, filtered, the filter cake washed with water, then with water acidified with hydrochloric acid and finally again washed with water and dried at 50° C. One thus obtains 30 parts of a dark blue powder which is insoluble in water.

10 parts of this dyestuff are suspended in water at 50–55° C., 20 parts of methyl sulphate are added over a period of half an hour, the solution is agitated at this temperature for half an hour, the temperature is raised to 60° C. and is maintained at 60–65° C. for half an hour. The solution is then cooled to 0° C., neutralized with 40% caustic soda to a pH of 6.5, filtered in order to eliminate the sodium sulphate which has crystallised out and the volume of the filtrate is adjusted to 100 parts by the addition of water. When this solution of the tetrasulphomethylate of 1,4-bis[2′,4′,6′-trimethyl-3′-bis-(dimethylsulphonioethyl)-aminosulphonylphenylamino] - anthraquinone is applied on a cellulosic fabric according to the methods described in Example 1, 2 or 4 a marine blue dyeing which is very fast to wet tests is obtained.

EXAMPLE 6

15 parts of [2-hydroxy-naphthalene]-<1 azo 7>[1,5-disulpho-naphthalene] are introduced into 110 parts of chlorosulphonic acid, the reaction mixture is heated to 70° C. in three-quarters of an hour, is maintained at this temperature for 2 hours, cooled to 60° C., 20 parts of thionyl chloride are added, the mixture is again heated for three hours at 70–80° C., cooled to room temperature, is poured into 200 parts of salt solution and 500 parts of ice, filtered and the solid material is washed with iced water. The sulphochloride filter cake obtained in this manner is suspended in 300 parts of iced water, 25 parts of bis-(β-methylthioethyl)-amine hydrochloride are added, the pH is adjusted to 10–10.5 with the aid of a 2 N solution of caustic soda, this pH value is maintained for 7 hours at 0–5° C., the mixture is then stirred for 2 days at room temperature and pH 9, is acidified with hydrochloric acid, filtered and the solid material is washed with water and is dried at 50° C. One thus obtains a dark red powder which is insoluble in water and in sodium carbonate solution, even when these are boiling. This dyestuff is solubilized by replacing the thioether groups by sulphonium groups introduced by means of methyl sulphate according to the method of Example 1. The product obtained possesses about three bis-(dimethylsulphonioethyl)-aminosulphonyl groups. When this dyestuff is applied according to the methods of Example 1 or 2 it provides red shades which are very fast to wet tests.

EXAMPLE 7

10 parts of the product which has the formula:

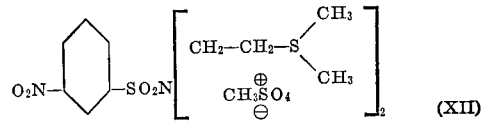

(XII)

are reduced with iron in a medium of very dilute acetic acid and at 75–80° C., the product is diazotized and then coupled with 3′-sulphonamido-1-phenyl-3-methyl-5-pyrazolone. The yellow dyestuff obtained in this manner may be used to dye cellulosic, woolen and silk fibres according to the methods described in Example 1 or 2 and provides yellow shades which are very fast to wet tests. The dyestuff obtained is the disulphomethylate of [bis(dimethylsulphonio - ethyl)-3-aminosulphonyl-benzene]-<1 azo >4-[3′-sulphonamido-1-phenyl-3-methyl-4-hydroxy-pyrazole].

The sulphonium salt represented by (XII) may be prepared in the following manner: 70 parts of bis-(β-methylthioethyl)-amine hydrochloride are dissolved in 200 parts of water, the solution is cooled to 0° C., 66 parts of m-nitrobenzene-sulphochloride are added, caustic soda is used to adjust the pH to 11, the solution is agitated for 7 hours at the same pH and temperature values, 10 parts of sodium carbonate are added and the reaction mixture is stirred overnight at room temperature. It is then heated to 45–47° C., maintained at this temperature for 4 hours, whilst if necessary sodium carbonate is added to maintain an alkaline pH value, the reaction mixture is then filtered and the filter cake is washed with water and dried at 50° C. One thus obtains 98 parts of a product which, after recrystallisation from alcohol, has a melting point of 78–79° C.

*Analysis.*—Calculated for $C_{12}H_{18}N_2O_4S_3$ (percent): N, 8.00; S, 27.43. Found (percent): N, 8.05; S, 27.56.

The thioether groups of the sulphonamide are replaced by the sulphonium groups by using the procedure described in Example 1.

EXAMPLE 8

7 parts of m-amino bis-(β-methylthioethyl)-sulphoamidobenzene prepared as in Example 7 are diazotized with hydrochloric acid and sodium nitrite and are coupled in an alkaline medium with 4.5 parts of 4-suphonamidonaphthol-1. When the coupling reaction is completed the reaction mixture is filtered, the solid product washed with water and suspended in 25 parts of water at 50–55° C. The dyestuff is solubilized with the aid of 20 parts of methyl sulphate according to the method described in Example 1. The dyestuff obtained is the disulphomethylate of [bis - (dimethylsulphonio - ethyl)-3-aminosulphonyl-benzene]-<1 azo 2>-[4-sulphonamido-1-hydroxy naphthalene]. After neutralization with a caustic soda solution one obtains a dyestuff capable of dyeing cellulosic fabrics, according to the procedures described in Example 1, 2 or 4, in reddish orange shades which are very fast to wet tests.

EXAMPLE 9

5 parts of N,N′-bis-(1-hydroxy-3-sulpho-6-naphthyl)-urea are dissolved in 50 parts of water and 10 parts of sodium carbonate, the solution is cooled to 5° C., a solution of a diazonium salt prepared from 12.5 parts of m-amino bis - (β - methylthioethyl)-sulphonamido-benzene, is added, the solution is agitated until the coupling reaction is completed, 50 parts of sodium chloride are added and the reaction mixture is filtered. The filter cake obtained in this manner is suspended in 50 parts water at 50–52° C. and the dyestuff is solubilized with the aid of 25 parts of methyl sulphate according to the procedure described in Example 1. One thus obtains a solution of the tetrasulphomethylate of N,N′-bis[bis - (dimethylsulphonio-ethyl) - 3′ - aminosulphonyl - 2 - phenylazo-1-hydroxy - 3 - sulpho-6-naphthyl]urea which dyes cellulosic fabrics in reddish orange shades which are very fast to wet tests.

EXAMPLE 10

6.4 parts of m-amino bis-(β-methylthioethyl)-sulphonamido-benzene prepared according to Example 7 are diazotized by means of hydrochloric acid and sodium nitrite. In three quarters of an hour a neutral solution of 6.4 parts of 1-hydroxy - 8 - amino-naphthalene-3,6-disulphonic acid dissolved in 100 parts of water are introduced, the mixture is agitated for 7 hours at 0–5° C. and is allowed to stand overnight at room temperature. It is then heated for half an hour at 48–50° C., made alkaline with sodium carbonate, cooled to 5° C., a solution of a diazonium salt prepared from 6.4 parts of m-amino-bis-(β-methylthioethyl)-sulphonamido-benzene is added, the pH is maintained alkaline with the aid of sodium carbonate and the reaction mixture is left under stirring. When the coupling reaction has been completed the [bis-(β-methylthioethyl) - 3 - sulphonamido-benzene]<1 azo 7>-[1-hydroxy-3,6-disulpho - 8 - aminonaphthalene]-<2 1>-[bis-(β-methylthioethyl) - 3 - sulphonamido-benzene], which is only sparingly soluble in water is filtered off. The product is washed with a little water until the colour of the filtrate is no longer red and the dyestuff is then dried at 60° C. In this manner one obtains 18 parts of a dark blue powder.

10 parts of this dyestuff are treated with 20 parts of methyl sulphate at 50–52° C. according to the procedure described in Example 1. One thus obtains a dark blue solution of the tetrasulphonium derivative which dyes cellulosic fabrics in marine blue shades which are fast to wet tests.

EXAMPLE 11

Phthalocyanine tetrasulphochloride is prepared from 12 parts of copper phthalocyanine according to the method of Example 1 and the sulphochloride filter cake obtained in this manner is treated in 300 parts of iced water with 13 parts of N,N'-bis-(β-methylthioethyl) - propylenediamine dissolved in 50 parts of acetone. 10 parts of anhydrous sodium carbonate are added to the reaction mixture, it is agitated for 8 hours at 0–5° C., 2 parts of monoethanolamine and 7 parts of sodium carbonate are added and the reaction mixture is left overnight at room temperature. Next it is heated to 45–50° C. in half an hour maintained at this temperature for 5 hours, cooled to room temperature, acidified with 35 parts of concentrated hydrochloric acid, filtered and the filter cake is washed with water and is dried at 50° C. This results in the formation of 32 parts of a water-insoluble dyestuff.

The dyestuff prepared in this manner may be rendered water soluble by transforming its thioether groups into sulphonium groups with the aid of methyl sulphate and according to the procedure described in Example 1, one obtains a product of formula:

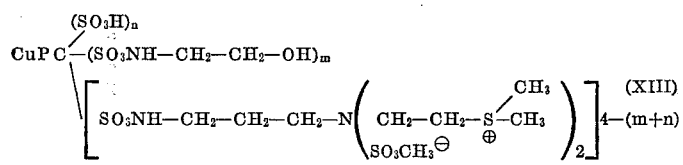

in which $4-(m+n)$ is about 2.5 and $m$ about 1.

The dyestuff which is thus obtained may be used to dye cellulosic fibers according to the methods of Examples 1 or 2 or by using the following process: 2 parts of triethanolamine are added to 450 parts of an aqueous neutral solution of 2 parts of the dyestuff, 25 parts of cellulosic fabric are introduced into this solution, the temperature is raised to 80° C. in half an hour and then is maintained at 80–85° C. for three quarters of an hour. There is almost total exhaustion of the dye bath and very lively blue shades resistant to wet tests are obtained.

The N,N-bis-(β-methylthioethyl) - propylene - diamine used in this example may be prepared in the following manner: 220 parts of concentrated hydrochloric acid are added to 170 parts of N,N-bis-(hydroxyethyl)-propylene-diamine, the water and excess acid are distilled off under vacuum, 500 parts of 1,2-dichloroethane are added to the residue, the solvent and the residual water are again distilled off but at ambient pressure and finally under vacuum until the temperature of the reaction mixture increases to 95–98° C. 600 parts of 1,2-dichloroethane are added to the distillation residue, the mixture is cooled to 20–30° C. and 200 parts by volume of thionyl chloride are added over a period of 2 hours. The temperature of the reaction mixture is increased to 50–60° C., maintained for 3 hours, allowed to fall to room temperature, dichloroethane is decanted off and 1000 parts by volume of acetone are added. The solution is allowed to crystallise out, the crystals are filtered off, washed with acetone and dried under vacuum. 261 parts of N,N-bis-(β-chloroethyl)-propylene diamine hydrochloride are obtained.

176 parts of caustic soda are added to 800 parts of alcohol maintained at −10° C., the mixture is stirred at this temperature for half an hour and then 100 parts of methanethiol followed by 260 parts of N,N-bis-(β-chloroethyl)-propylenediamine hydrochloride mixed with 250 parts of alcohol are added. The reaction mixture is agitated for 1 hour at −10° C. to 0° C., the temperature is then allowed to rise to 50–60° C., the mixture is maintained for three and a half hours at 50–60° C., and then is refluxed for 2 hours, cooled, the sodium chloride is filtered off and the solvent is distilled off under vacuum. 200 parts by volume of benzene are added to the residue, the mixture is filtered in order to eliminate impurities and then, under vacuum, first the benzene is distilled off and then the product which comes over at 157–160° C. at 3–4 mm./Hg pressure. One obtains 173 parts of N,N-bis-(β-methylthioethyl)-propylenediamine.

EXAMPLE 12

18.5 parts of N,N-bis-(β-ethylthioethyl)-amine dissolved in 50 parts acetone are added to a suspension, in 300 parts of iced water, of phthalocyanine tetrasulphochloride prepared from 12 parts of copper phthalocyanine by the method according to Example 1. Next 17 parts of sodium carbonate are added, the reaction mixture is agitated for 8 hours at 0–5° C., 6 parts of monoethanolamine and 5 parts of sodium carbonate are added and the mixture is stirred for 15 hours at room temperature. It is then heated for 5 hours at 45–50° C., cooled to 10°., acidified with 30 parts of concentrated hydrochloric acid, filtered, the filter cake washed with water and dried at 50° C. One thus obtains 58 parts of a water-soluble dyestuff.

The solubilization may be effected by the procedure described in Example 1 according to which the dyestuff is treated with methyl sulphate in an aqueous medium or in the presence of a solvent. This results in the formation of a dyestuff which is very water-soluble and on being applied according to the procedures of Examples 1 or 11 gives a very lively blue shade which is fast to wet tests.

The N,N-bis-(β-ethylthioethyl)-amine used in this example may be prepared in the following manner: 113 parts of caustic soda are added to 800 parts by volume of absolute alcohol maintained at −10° C., the mixture is stirred at this temperature for half an hour, 100 parts of ethanethiol and then 153 parts of N,N-bis-(β-chloroethyl)-amine hydrochloride mixed with 250 parts of absolute alcohol are added. The reaction mixture is agitated for one hour at −3° C. to 0° C., the temperature is allowed to rise by itself, the mixture is then heated for two and a half hours at 50–55° C. and then is refluxed for two hours. It is then cooled to 10° C., the sodium chloride which has been formed is filtered off, the solvent is distilled off under vacuum, 200 parts of benzene are added, the mixture is filtered and then is distilled under vacuum, the benzene coming off first and then the amine which is collected at 117–121° C. at 3 mm./Hg pressure. One thus obtains 141 parts of N,N-bis-(β-ethylthioethyl)-amine.

I claim:
1. Dyestuff of the formula:

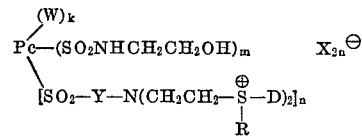

in which Pc represents the nucleus of an unsubstituted metalliferrous phthalocyanine, the metal of which is copper, cobalt, chromium, nickel, manganese or iron, W represents —$SO_3H$, —COOH or $SO_2H$, Y represents a direct bond or —NH— alkylene, said alkylene having up to three carbon atoms, D and R each represent methyl or ethyl, $n$ is a number from 2 to 4, $k$ and $m$ each are 0 or a number to 1, and X represents an uncoloured monovalent anion.

References Cited

UNITED STATES PATENTS

| | | | | |
|---|---|---|---|---|
| 2,260,380 | 10/1941 | Jones | | 260—583UX |
| 2,754,328 | 7/1956 | Proell | | 260—583 |
| 3,152,109 | 10/1964 | Taber | | 260—158X |
| 3,169,822 | 2/1965 | Randall et al. | | 260—163X |
| 3,351,579 | 11/1967 | Baier | | 260—158 |

FOREIGN PATENTS

| | | | |
|---|---|---|---|
| 931,557 | 7/1963 | Great Britain | 260—158 |

FLOYD D. HIGEL, Primary Examiner

U.S. Cl. X.R.

8—4, 41, 50, 51; 260—163, 175, 191, 195, 198, 246, 371, 459, 583, 584